July 30, 1963     H. MOORE     3,099,071
TOOL FOR CUTTING GROOVES IN THE FLANKS OF SCREWS
Filed Jan. 14, 1963

*INVENTOR.*
HARRINGTON MOORE
BY
Moore & Altman
ATTORNEYS

United States Patent Office 3,099,071
Patented July 30, 1963

3,099,071
TOOL FOR CUTTING GROOVES IN THE
FLANKS OF SCREWS
Harrington Moore, East Acton, Mass.
(100 Beaver St., Waltham, Mass.)
Filed Jan. 14, 1963, Ser. No. 251,307
3 Claims. (Cl. 29—95.1)

This invention relates to a tool for rapidly cutting one or more longitudinal grooves or kerfs in the flanks of a headless screw. It is an object of the invention to provide a tool having cutters having a number of cutting teeth which are selectively usable so that when the teeth in active use become dull or broken they can quickly be replaced by sharp teeth.

Figure 1:
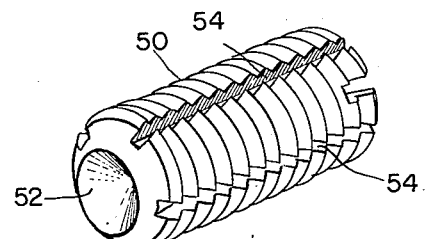
Figure 2:
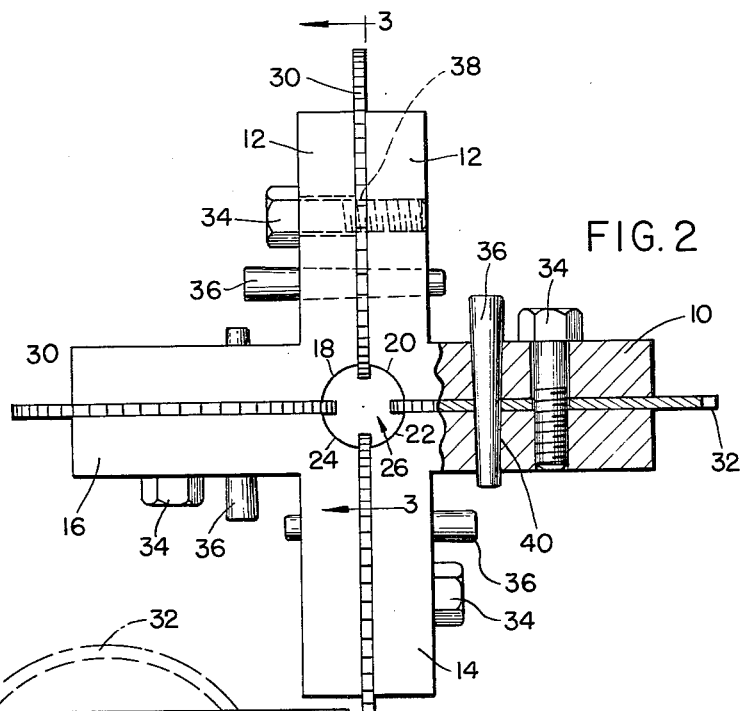
Figure 3:
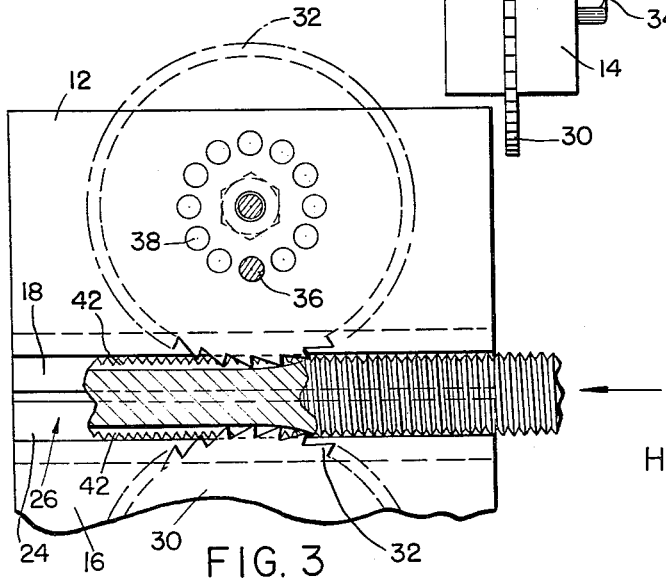

For a more complete understanding of the invention, reference may be had to the following description thereof, and to the drawing, of which FIGURE 1 is a perspective view of a grooved headless setscrew;

FIGURE 2 is an elevational view, on a smaller scale, of a tool embodying the invention; and FIGURE 3 is a section on the line 3—3 of FIGURE 2.

A tool embodying the invention is shown in FIGURE 2. This tool comprises a body made up of four L-shaped angle pieces 10, 12, 14, 16. These pieces are assembled back to back so that the assembly has the shape of a cross when viewed from an end thereof. Each angle piece has its exterior dihedral cut away to form a quadrantal groove as at 18, 20, 22, 24 in the respective angle pieces, the size and shape of the grooves being such that when the pieces are secured together with disks between them, as indicated in FIGURE 2, the grooves constitute a cylindrical bore 26 through which screws having a slightly smaller diameter can be pushed. Between each two of the body pieces is a spacer 30, one or more of which can be in the form of a circular disk having teeth 32 around its periphery. In the tool shown on the drawing, all four of the spacers 30 are cutters, that is, circular disks with teeth 32. These cutters are mounted in planes which contain the axis of the bore. A small segment of each, having a few of the peripheral teeth, projects into the bore 26 so as to be engaged by screws which are pushed through the bore. The pairs of angle pieces are secured together releasably by any suitable means such as bolts 34 which pass through the disks 30 between the angle pieces. As shown, a single bolt 34 goes through the center of each disk 30. To prevent rotation of each disk about its bolt, a pin 36 is thrust into a hole 38 through the disk offset from the center of the disk. The hole 38 is one of a circular series of similar holes equidistant from the center of the disk as shown in FIGURE 3. Any one of the holes 38 can be brought into registry with a hole 40 through the opposed portions of each pair of angle pieces. Four pins 36 are provided to hold all of the disks 30 against rotation when the tool is in use. The teeth 32 on the disks are of the "handsaw" variety so that the teeth actually operating on the work piece cut with a positive rake.

If any of the active teeth on the cutters become dull or are broken, fresh teeth can be brought into action removing the pin 36, slacking off on the corresponding bolt 34, turning the cutter 30 until another hole 38 registers with the hole 40, inserting the pin 36 and tightening the bolt 34.

When a headless screw, a threaded rod, or any other cylindrical object of the same diameter is pushed through the bore 26 some of the teeth 32 which project into the bore act as cutters to gouge grooves 42 of progressively greater depth, these grooves being longitudinal, that is, parallel to the axis of the screw. The resulting product is illustrated in FIGURE 1 wherein is shown a headless setscrew 50 having a cupped end 52 and four longitudinal grooves 54 which intersect all of the turns of screw-thread. If such a screw is hardened, it can cut a thread in a hole in a softer metal through which it is being driven.

I claim:

1. A tool for cutting longitudinal grooves in the flanks of headless screws, said tool comprising a body having a bore therethrough with a diameter slightly greater than that of the screws to be operated on, a circular disk firmly but removably mounted in said body in a plane containing the axis of said bore, said disk having teeth all around its periphery, a few of said teeth projecting into said bore, and adjustable means positively preventing rotation of said disk in said body.

2. A tool as described in claim 1, and a second disk similar to said disk and similarly mounted in said body in said plane.

3. A tool for cutting longitudinal grooves in the flanks of headless screws, said tool comprising a body with a bore therethrough, said body consisting of four L-shaped pieces secured back to back, the exterior dihedral of each piece being cut away to form a quadrantal groove, said grooves together constituting said bore, a circular disk clamped between the opposing backs of each two of said pieces, each said disk having peripheral teeth a few of which project into said bore, and means releasably securing said pieces together.

No references cited.